US010423821B2

(12) United States Patent
Raudies et al.

(10) Patent No.: US 10,423,821 B2
(45) Date of Patent: Sep. 24, 2019

(54) AUTOMATED PROFILE IMAGE GENERATION BASED ON SCHEDULED VIDEO CONFERENCES

(71) Applicant: Microsoft Technology Licensing, LLC, Redmond, WA (US)

(72) Inventors: Florian Raudies, Mountain View, CA (US); Yi Zhen, San Jose, CA (US); Ajith Muralidharan, Sunnyvale, CA (US); Yiming Ma, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 15/793,861

(22) Filed: Oct. 25, 2017

(65) Prior Publication Data

US 2019/0122030 A1  Apr. 25, 2019

(51) Int. Cl.
*G06K 9/00* (2006.01)
*H04N 7/15* (2006.01)
*G06T 11/60* (2006.01)
*H04L 29/08* (2006.01)

(52) U.S. Cl.
CPC ..... *G06K 9/00288* (2013.01); *G06K 9/00261* (2013.01); *G06K 9/00281* (2013.01);
(Continued)

(58) Field of Classification Search
CPC ...... G06F 3/011; G06F 3/0481; G06F 3/0484; G06F 16/285; G06F 3/04845; G06F 3/16; G06F 3/013; H04L 65/4015; H04L 65/403; H04L 51/32; H04L 67/306; H04L 51/04; H04N 7/142; H04N 7/152; H04N 5/23219; H04N 13/239; H04N 21/4415; H04N 7/15; H04N 7/157; H04N 7/147; H04N 21/4223; H04N 21/23412; H04N 21/4394;
(Continued)

(56) References Cited

U.S. PATENT DOCUMENTS

6,526,161 B1* 2/2003 Yan .................... G06K 9/00281
382/118
6,885,761 B2* 4/2005 Kage .................. G06K 9/00228
345/581
(Continued)

*Primary Examiner* — Aklilu K Woldemariam
(74) *Attorney, Agent, or Firm* — Schwegman Lundberg & Woessner, P.A.

(57) ABSTRACT

Disclosed are systems, methods, and non-transitory computer-readable media for automated profile image generation based on scheduled video conferences. A profile image generation system generates, based on image data captured during a first video conference, a first facial feature data set for a first identified face identified from the image data. The first facial feature data set includes numeric values representing the first identified face. The profile image generation system calculates, based on the first facial feature data set and historic facial feature data sets generated from image data captured during previous video conferences, a first value indicating a likelihood that the first identified face is a first meeting participant that participated in the first video conference. The profile image generation system determines that the first value meets or exceeds a threshold value, and in response, determines that the first identified face is the first meeting participant.

15 Claims, 5 Drawing Sheets

(52) U.S. Cl.
CPC .............. *G06T 11/60* (2013.01); *H04L 67/306* (2013.01); *H04N 7/155* (2013.01)

(58) Field of Classification Search
CPC ......... H04N 21/44012; H04N 5/23216; H04N 5/23293; H04N 7/155; B25J 11/001; G10L 15/30; G10L 15/26; G06Q 30/0269; G06Q 10/10; G06K 9/00281; G06K 9/00288; G06K 9/621; G06K 2009/4666; G06K 9/00228; G06K 9/46; G06K 9/00248; G06K 9/0061; G06K 9/00744; G06K 9/00261; G06T 2207/10016; G06T 9/001; G06T 2207/30201; G06T 7/60; G06T 7/73; G06T 2215/16; G06T 3/40; G06T 11/60; A61B 5/7267; A61B 3/113; G11B 27/28; G09G 2320/0261; G09G 2320/028; G09G 2340/12
USPC ................ 382/118, 190, 254; 345/156, 173
See application file for complete search history.

(56) References Cited

U.S. PATENT DOCUMENTS

| | | | | |
|---|---|---|---|---|
| 7,626,569 B2 * | 12/2009 | Lanier | ................ | G06F 1/1601 345/156 |
| 8,243,118 B2 * | 8/2012 | Pace | ................ | G06K 9/00261 348/14.01 |
| 2008/0166025 A1 * | 7/2008 | Thorne | ............. | G06K 9/00228 382/118 |
| 2010/0205541 A1 * | 8/2010 | Rapaport | ............... | G06Q 10/10 715/753 |
| 2010/0250249 A1 * | 9/2010 | Fujino | .................. | H04N 7/147 704/235 |
| 2011/0205330 A1 * | 8/2011 | Liu | ....................... | H04N 7/142 348/14.08 |
| 2011/0279638 A1 * | 11/2011 | Periyannan | ........... | H04N 7/141 348/14.09 |
| 2013/0083154 A1 * | 4/2013 | Kim | .................. | H04L 65/1069 348/14.08 |
| 2014/0184550 A1 * | 7/2014 | Hennessey | ............. | G06F 3/013 345/173 |
| 2015/0077504 A1 * | 3/2015 | Fagadar-Cosma | ..... | H04N 7/147 348/14.08 |
| 2015/0085058 A1 * | 3/2015 | Zhang | .................. | H04N 7/142 348/14.02 |
| 2015/0195491 A1 * | 7/2015 | Shaburov | ................ | H04N 7/15 348/14.12 |
| 2015/0314454 A1 * | 11/2015 | Breazeal | ............... | B25J 9/0003 700/259 |
| 2017/0323481 A1 * | 11/2017 | Tran | ..................... | G06T 19/006 |
| 2017/0324933 A1 * | 11/2017 | Alrod | ...................... | H04N 7/15 |
| 2017/0332044 A1 * | 11/2017 | Marlow | .............. | G06K 9/00268 |
| 2018/0211440 A1 * | 7/2018 | Kunkel | ................ | G09G 3/00 |
| 2019/0122030 A1 * | 4/2019 | Raudies | ............ | G06K 9/00288 |

* cited by examiner

AUTOMATED PROFILE IMAGE GENERATION BASED ON SCHEDULED VIDEO CONFERENCES

TECHNICAL FIELD

An embodiment of the present subject matter relates generally to profile image generation and, more specifically, to automated profile image generation based on scheduled video conferences.

BACKGROUND

Many programs use an image to identify users. For example, social networking services often use a profile image to identify a user. Likewise security systems use images to identify users. Traditionally, a profile picture is either provided by a user (e.g., uploaded to the social networking service), or taken at a fixed time (e.g., when a user is first hired). Often, these pictures are used for many years without being updated. Further, these images often only provide a single perspective of the user. Accordingly, the user profile images are often outdated and limited in the data they provide. It is within this context that the present disclosure arises.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for automated profile image generation based on scheduled video conferences. A profile image generation system uses image data captured during a video conference to identify images of participating users and generate profile images for the users. The profile image generation system uses facial recognition techniques to identify faces from the image data and then generates a facial feature data set for each identified face. The facial feature data set includes a set of numeric values that represent the identified face. For example, the facial feature data set includes numeric values defining a vector that represents the identified face.

The profile image generation system calculates values for each facial feature set that indicate the likelihood that the identified face represented by the facial feature set is a known meeting participant of the video conference. The computation of the value is further based on historical facial feature data sets generated by the profile image generation system from image data captured during previous video conferences. For example, the profile image generation system determines whether a facial feature set is similar to a facial feature set generated from a previous video conference.

If the facial feature set is determined to be similar to a previous facial feature set, the profile image generation system uses the known meeting participants for each of the video conferences to determine the value indicating the likelihood that the identified face is each of the meeting participants. For example, if a meeting participant participated in both video conferences, the profile image generation system calculates a higher value indicating a higher likelihood that the identified face is that of the meeting participant. Alternatively, if a meeting participant did not participate in the previous video conference, the profile image generation system calculates a lower value indicating a lower likelihood that the identified face is the meeting participant.

The profile image generation system compares the value calculated for each meeting participant to a threshold value to determine whether the identified face is the meeting participant. For example, if the value meets or exceeds the threshold value, the profile image generation system determines that the identified face is the meeting participant. Alternatively, if the value does not meet or exceed the threshold value (i.e., the value is below the threshold value), the profile image generation system determines that the identified face is not the meeting participant or that there is insufficient data to reliably determine whether the identified face is the meeting participant.

Once the profile image generation system determines that an identified face is a meeting participant, the profile image generation system assigns image data from the video conference that depicts the meeting participant to an account associated with the meeting participant. The assigned image data is used to generate a portfolio of profile images of the user, which can be used for a variety of purposes. For example, the profile images can be used for security purposes, identification, to generate an avatar, etc.

Figure 1:
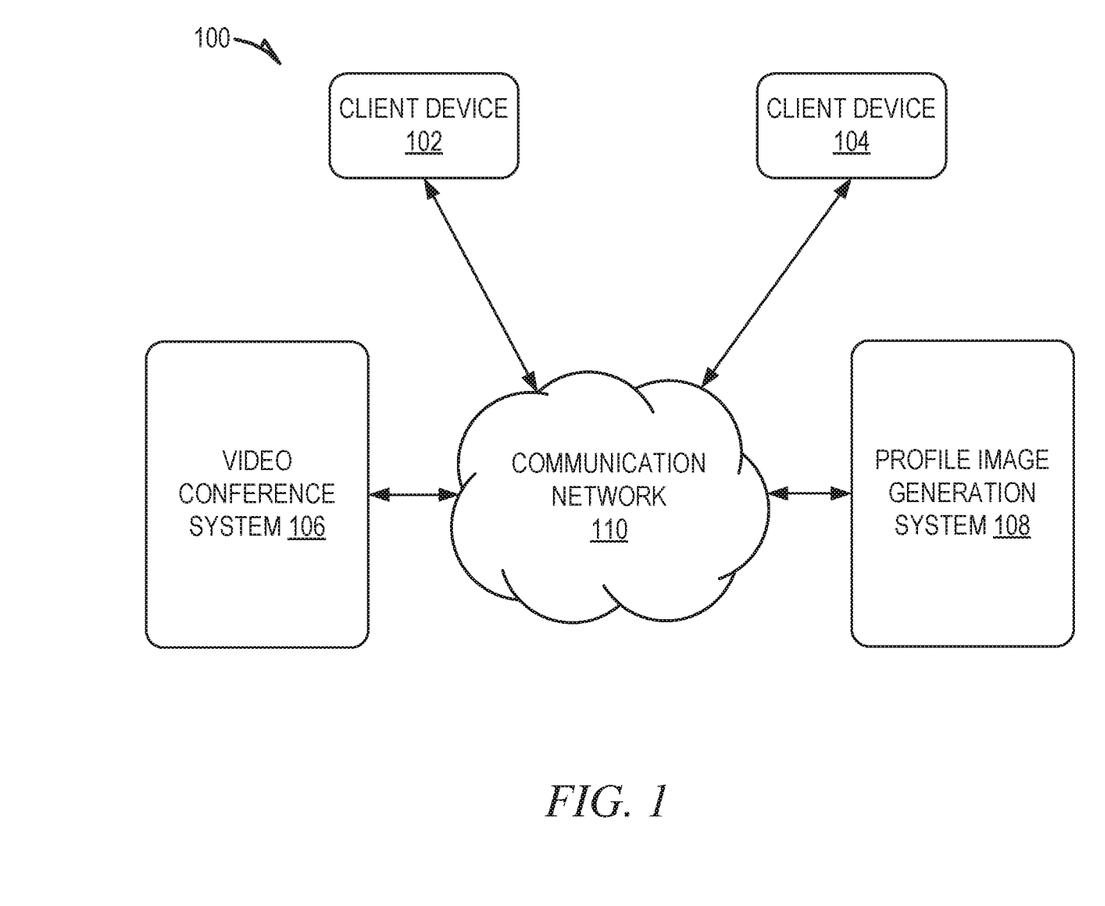
FIG. 1 shows an example system configuration, wherein electronic devices communicate via a network for purposes of exchanging content and other data.

FIG. 1 shows an example system configuration 100, wherein electronic devices communicate via a network for purposes of exchanging content and other data. As shown, multiple devices (i.e., client device 102, client device 104, video conference system 106, and profile image generation system 108) are connected to a communication network 110 and configured to communicate with each other through use of the communication network 110. The communication network 110 is any type of network, including a local area network ("LAN"), such as an intranet, a wide area network ("WAN"), such as the internet, or any combination thereof. Further, the communication network 110 may be a public network, a private network, or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Figure 5:
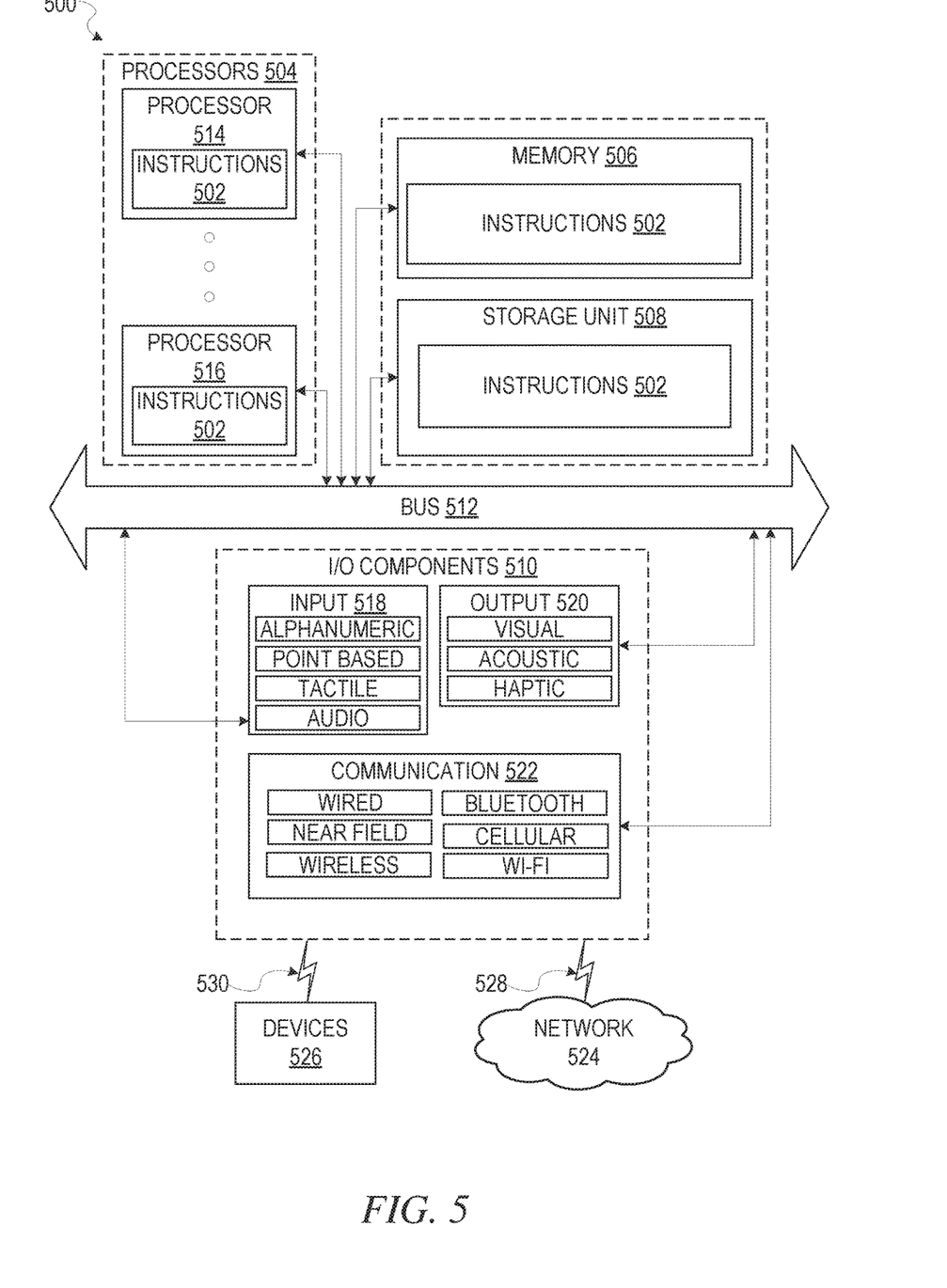
FIG. 5 shows a block diagram illustrating an example of a machine upon which one or more embodiments may be implemented

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the computing device 500 shown in FIGS. 5A and 5B.

To facilitate communication with other computing devices, a computing device includes a communication interface configured to receive a communication, such as a request, data, etc., from another computing device in network communication with the computing device and pass the communication along to an appropriate module running on the computing device. The communication interface also sends a communication to another computing device in network communication with the computing device.

In the system 100, meeting participants interact with the video conference system 106 to establish and manage video conferences with other users. For example, the meeting participants use the client devices 102 and 104 that are connected to the communication network 110 by direct and/or indirect communication to communicate with and utilize the functionality of the video conference system 106. Although the shown system 100 includes only two client devices 102, 104, this is only for ease of explanation and is not meant to be limiting. One skilled in the art would appreciate that the system 100 can include any number of client devices. Further the video conferences system 106 may concurrently accept connections from and interact with any number of client devices. The video conference system 106 support connections from a variety of different types of client devices, such as desktop computers; mobile computers; mobile communications devices, e.g. mobile phones, smart phones, tablets; smart televisions; set-top boxes; and/or any other network enabled computing devices. Hence, the client devices 102 and 104 may be of varying type, capabilities, operating systems, etc.

A meeting participant interacts with the video conference system 106 via a client-side application installed on the client devices 102 and 104. In some embodiments, the client-side application includes a video conference system specific component. For example, the component is a stand-alone application, one or more application plug-ins, and/or a browser extension. However, the meeting participant may also interact with the video conference system 106 via a third-party application, such as a web browser, that resides on the client devices 102 and 104 and is configured to communicate with the video conference system 106. In either case, the client-side application presents a user interface (UI) for the user to interact with the video conference system 106. For example, the user interacts with the video conference system 106 via a client-side application integrated with the file system or via a webpage displayed using a web browser application.

The video conference system 106 facilitates and manages video conferences between various client devices. For example, the video conference system 120 facilitates a video conference between client devices 102 and 104, where a meeting participant using one client device 102 can send and receive audio and/or video with a meeting participant using the other client device 104.

The video conference system 106 enables users to schedule and/or initiate a video conference, including adding meeting participants, scheduling a time, transmitting meeting invites, etc. Once a video conference is initiated, the video conferences system 106 established connections with client devices used by the meeting participants and receives and sends data to/from the client devices. For example, to manage a video conference between a meeting participants using client devices 102 and 104, the video conference system 106 receives video conference data, (e.g., audio data, video data, etc.), from one client device 102, and transmits the received video conference data to the other client device 104, where it is presented by the client device 104 to the meeting participant. Likewise, the video conference system 104 receives video conference data from the other client device 104 and transfers the received video conference data to the client device 102, where it presented by the client device 102 to the meeting participant. This allows meeting participants using the client devices 102 and 104 to receive and share data, including audio and/or video data, thereby enabling the meeting participants to have a real time meeting although they may be in different locations.

The video conferences system 106 also monitors attendance of the video conference, such as which meeting participants are attending the video conference, which client devices are the meeting participants using, the start and end time of the video conference, etc. The video conferences system 106 stores data received during a video conference. For example, the video conferences system 106 stores video conferences data, such as audio and video data transmitted between the client devices, the meeting participants that attended the video conferences, the start and end time of the video conference, etc. The stored data is associated with a unique identifier that identifies the corresponding video conferences.

The profile image generation system 108 automates profile image generation based on scheduled video conferences. The profile image generation system 108 uses image data captured during a video conference to identify images of participating users and generate profile images for the users. For example, the profile image generation system 108 communicates with the video conference system 106 to gather stored video conference data, such as image data, as well as data describing the scheduled meeting participants. Image data includes data associated with images and/or video captured during a video conference.

The profile image generation system 108 uses facial recognition techniques to identify faces from the image data and then generates a facial feature data set for each identified face. The facial feature data set includes a set of numeric values that represent the identified face. For example, the facial feature data set includes numeric values defining a vector that represents the identified face.

The profile image generation system 108 calculates values for each facial feature set that indicate the likelihood that the identified face represented by the facial feature set is one of the known meeting participants of the video conference. The value is calculated based on historical facial feature data sets generated by the profile image generation system 108 from image data captured during previous video conferences. For example, the profile image generation system determines whether a facial feature set is similar to a facial feature set generated from a previous video conference.

To determine whether a facial feature set is similar to another facial feature set, the profile image generation system 108 uses a distance function to determine a distance between the vectors defined by the facial feature data sets. If the vector is determined to be within a threshold distance of another vector, the profile image generation system 108 determines that the two facial feature sets corresponding to the vectors are sufficiently similar to indicate that they represent the face of the same person.

If the facial feature set is determined to be similar to a previous facial feature set, the profile image generation system 108 uses the known meeting participants for each of the video conferences to determine the value indicating the likelihood that the identified face is each of the meeting participants. For example, if a meeting participant participated in two video conferences, the profile image generation system 108 has more data to disambiguate using conference participant lists from both meetings. In case this meeting participant is the only one that participated in both meetings then disambiguation between its facial feature set and identity can be resolved.

The profile image generation system 108 compares the value calculated for each meeting participant to a threshold value to determine whether the identified face is the meeting participant. For example, if the value meets or exceeds the threshold value, the profile image generation system 108 determines that the identified face is the meeting participant. Alternatively, if the value does not meet or exceed the threshold value (i.e., the value is below the threshold value), the profile image generation system 108 determines that the identified face is not the meeting participant or that there is insufficient data to reliably determine whether the identified face is the meeting participant.

In some embodiments, the previous facial feature data set that was identified as being similar to the facial feature data set may have already been identified as being a specified user. In this type of situation, the profile image generation system 108 determines that the facial feature data set represents the same user (i.e., meeting participant) as the previous facial feature data set.

Once the profile image generation system 108 determines that an identified face is a meeting participant, the profile image generation system 108 assigns image data from the video conference that depicts the meeting participant to an account associated with the meeting participant. The assigned image data is used to generate a portfolio of profile images of the user, which can be used for a variety of purposes. For example, the profile images can be used for security purposes, identification, to generate an avatar, etc.

Figure 2:
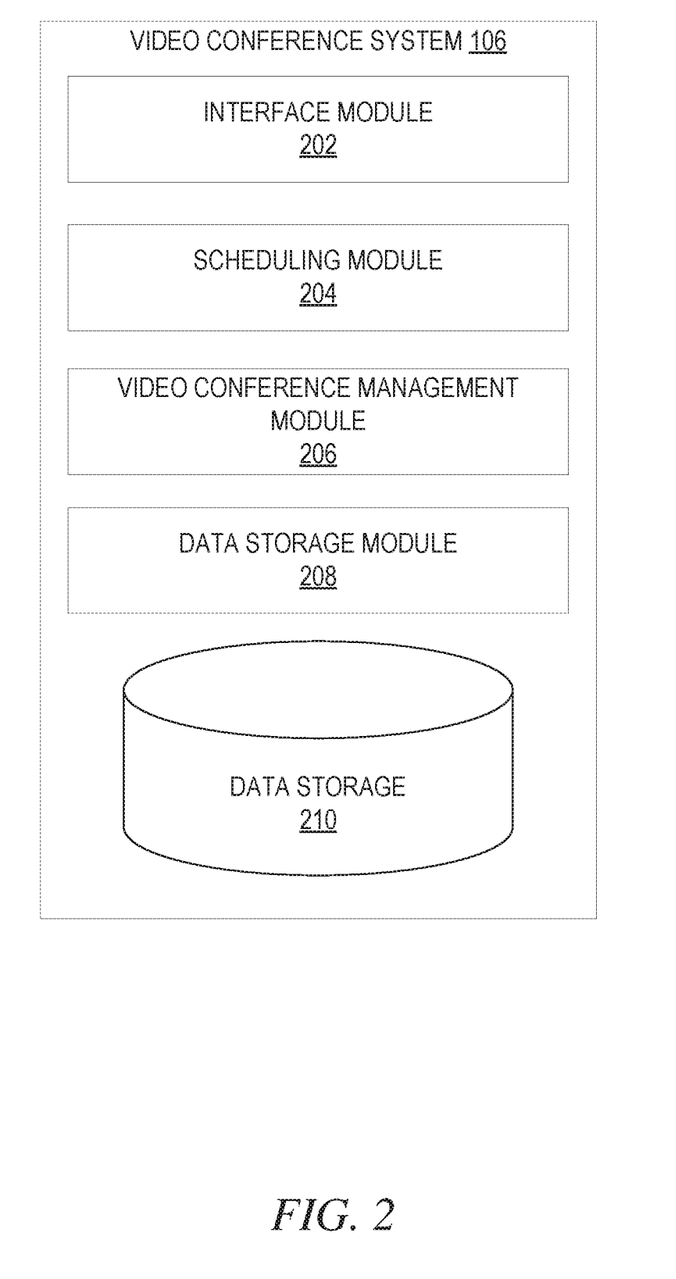
FIG. 2 is a block diagram of the video conference system, according to some example embodiments.

FIG. 2 is a block diagram of the video conference system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the video conference system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the video conferences system 106 includes an interface module 202, a scheduling module 204, a video conference management module 206, a data storage module 208, and data storage 210. The interface module 202 provides a user with a video conference interface that enables the user to create and manage a video conference. The video conference interface provides the user with user interface elements, such as text boxes, buttons, check boxes, etc., that allow a user to create a new video conference, select meeting participants, transmit invitations, etc. For example, the video conference interface provides the user with user interface elements that allow the user to select a meeting start time and settings to create a new video conference. Further, the video conference interface presents the user with and allows the user to select potential meeting participants and/or allows the user to enter contact info for desired meeting participants.

The scheduling module 204 schedules a video conference based on input provided by a user using the video conference interface. For example, the scheduling module 204 generates a unique identifier to identify the video conference and stores the unique identifier along with data describing the created video conference, including a start time, end time, invited meeting participants, etc. The scheduling module 204 stores this data in data storage 210. The scheduling module 204 further generates invites and login information for the invited meeting participants and transmits the invites to the meeting participants.

The video conference management module 206 executes and facilitates a video conference. Once a video conference is initiated (e.g., the meeting participants have logged into the meeting), the video conference management module 206 established connections with client devices used by the meeting participants and begins receiving and sends data to/from the client devices. For example, the video conference management module 206 receives video conference data, (e.g., audio data, video data, etc.), from the client devices, and transmits the received video conference data to the other client devices being used to participate in the video conference, where the data is then presented by the client devices to the meeting participants. This allows meeting participants using the client devices to receive and share data, including audio and/or video data (e.g., image date), thereby enabling the meeting participants to have a real time meeting although they may be in different locations.

The video conference management module 206 also monitors attendance of the video conference, such as which meeting participants are attending the video conference, which client devices are the meeting participants using, the start and end time of the video conference, etc.

The data storage module 208 stores data gathered during a video conference in the data storage 210. For example, the data storage module 208 stores video conferences data, such as audio and video data (e.g., image data) transmitted between the client devices, the meeting participants that attended the video conferences, the start and end time of the video conference, etc. The stored data is associated with the unique identifier that identifies the corresponding video conferences.

Figure 3:
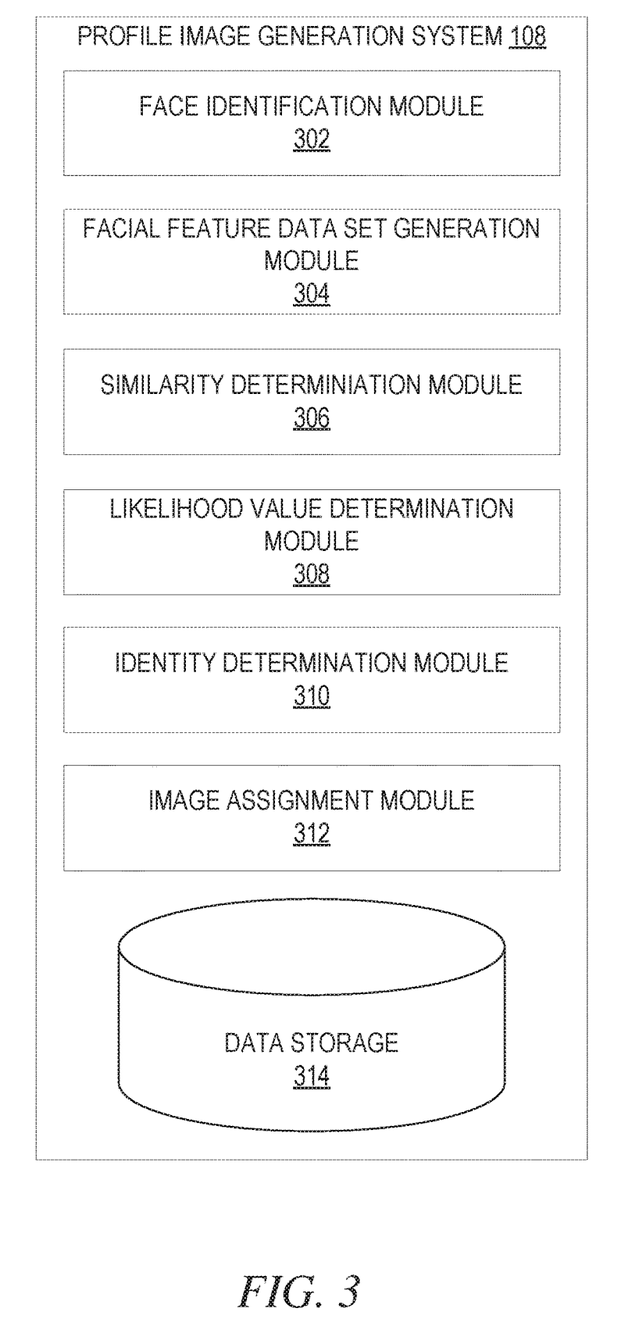
FIG. 3 is a block diagram of the video conference system, according to some example embodiments.

FIG. 3 is a block diagram of the profile image generation system 108, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the profile image generation system 108 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the profile image generation system 108 includes a face identification module 302, a facial feature data set generation module 304, a similarity determination module 306, a likelihood value determination module 308, an identity determination module 310, an image assignment module 312, and a data storage 314.

The face identification module 302 identifies user faces captured in video during a video conference. The face identification module 302 communicates with the video conference system 106 to access image data gathered during the video conference. Image data includes data describing individual images captured during a video conference, such as each frame of the video. The face identification module 302 uses facial recognition techniques to identify faces from the image data. Each identified face may be one of the meeting participants of the meeting, although it is possible that other uses not included as meeting participants (i.e., not registered as meeting participants) may also be captured during the video conference and identified by face identification module 302.

Further, the face identification module 302 may identify multiple faces that are of the same meeting participant. For example, the face identification module 302. may identify a first face that is a front view of a meeting participant and a second face that is a different aspect (e.g., side, back, etc.) of the same meeting participant. The face identification module 302 provides image data of the identified faces to the facial feature data set generation module 304. The image data provided may be a subset of the image data for each frame of video, such as a subset of the image data that depicts the identified face. Alternatively, the image data may include the entirety of each frame in which the identified face is captured and/or most prominently shown.

The facial feature data set generation module 304 generates a facial feature data set for each face identified by the face identification module 302 from the image data. A facial feature data set includes numeric values that represent the identified face. For example, the numeric values define a vector that represents the image of the identified face. Each value in the facial feature data set represents a feature of the image data of the identified face.

In some embodiments, the facial feature data set generation module 304 generates a facial feature data set based on each received image of the identified face. Alternatively, the facial feature data set generation module 304 generates a facial feature data set based on a subset of the images of the identified face. For example, the facial feature data set generation module 304 generates the facial feature data set for images of the identified face that are spaced out or determined to be sufficiently distinct from one another. As a result, the facial feature data set generation module 304 will reduce resource usage associated with generating facial feature data sets that are near identical.

The facial feature data set generation module 304 stores the generated facial feature sets in the data storage 314. The facial feature data sets are stored with metadata describing the facial feature data set, such as unique identifier for the video conference from which the facial feature data set was generated. Further, the facial feature data set may be stored along with the image data used by the facial feature data set generation module 304 to generate the facial feature data set.

The similarity determination module 306 determines whether a generated facial feature data set is sufficiently similar to a previously generated facial feature data set to conclude that the identified face associated with each of the facial feature data sets is the same person. A previously generated facial feature data set is a facial feature data set that was previously generated by the facial feature data set generation module 304 and stored in the data storage 314. For example, a previously generated facial feature data set may have been generated by the facial feature data set generation module 304 based on image data captured during a previous video conference.

To determine whether a facial feature data set is sufficiently similar to a previously generated facial feature data set, the similarity determination module 306 accesses previously generated facial feature data sets from data storage 314 and uses a distance function to determine whether the distance between the facial feature data set (e.g., the vector defined by the facial feature data set) and any of the previously generated facial feature data sets (e.g., the vectors defined by the previously generated facial feature data sets) is within a threshold distance. If the similarity determination module 306 identifies a previously generated facial feature data set that is within a threshold distance, the similarity determination module 306 determines that the identified face associated with both facial feature data sets is of the same person. For example, the meeting participant depicted in the video conference also attended the previous video conference.

The likelihood value determination module 308 determines a value indicating the likelihood that a meeting participant of the video conference is the face identified from the image data, For example, the likelihood value determination module 308 calculates the value for each meeting participant of the video conference. The value may be a numeric value, such as a percentage indicating the likelihood that the meeting participant is the face identified from the image data. For example, the value can be 50 to represent that there is a 50% chance that the meeting participant is the identified face.

The likelihood value determination module 308 calculates the value based on a list of meeting participants of the video conference meeting and whether the facial feature data set generated to represent the face was determined to be similar to any previously generated facial feature data sets. If it is determined that the facial feature data set is not similar to any previously generated facial feature data sets, the value determination module 308 calculates the value based on the number of meeting participants that attended the video conference in which the face was detected. For example, the value determination module 308 uses the number of meeting participants to determine a percentage likelihood that each member is the face. For example, if there are only two meeting participants, the likelihood value determination module 308 calculates a value for each meeting participant indicating that there is a 50% chance that each meeting participant is the face. As another example, if the video conference had three meeting participants, the likelihood value determination module 308 calculates a value for each meeting participant indicating that there is a 33% chance that each meeting participant is the face.

Alternatively, if it is determined that the facial feature data set is similar to a previously generated facial feature data set, the likelihood value determination module 308 determines the values based on the number of common meeting participants that attended each of the video conferences in which the face was identified. For example, if the face was identified in two video conferences and only one meeting participant participated in both of those video conferences, the likelihood value determination module 308 calculates a high likelihood value (e.g., 99%, 100%) that the meeting participant that attended both video conferences is the face, and calculates a low likelihood value (e.g., 0%, 1%) for the meeting participants that did not attend both video conferences.

As another example, if only two meeting participants attended both video conferences, the likelihood value determination module 308 calculates a value for each meeting participant indicating that there is a 50% chance that each meeting participant is the face, whereas the meeting participants that attended both video conferences are assigned low values. As the meeting participants continue to attend additional video conferences with varying other meeting participants, additional data will be available to the likelihood value determination module 308, which will in turn make it easier to determine which meeting participant is the identified face.

In some instances, the profile image generation system 108 may have already determined that a previously generated facial feature data set is of a specified meeting participant. In these types of instances, the profile image generation system 108 determines that a facial feature data set that is determined to be similar to the previously generated facial feature set is also of the same meeting participant. In this type of instance, the likelihood value determination module 308 may not calculate values for the facial feature data set.

The identity determination module 310 uses the calculated values to determine whether a meeting participant is the identified face. To accomplish this, the identity determination module 310 compares the value calculated for the meeting participant to a threshold value. If the identity determination module 310 determines that the value meets or exceeds the threshold value, the identity determination module 310 determines that the meeting participant is the identified face. Alternatively, if the identity determination module 310 determines that the value does not meet or exceed the threshold value (i.e., the value is less than the threshold value), the identity determination module 310 determines that the meeting participant is not the identified face or that there is insufficient data to determine with certainty that the meeting participant is the identified face.

The image assignment module 312 assigns images determined to be of a user (i.e., meeting participant) to a user account associated with the user. For example, the data storage 314 stores a user account for multiple users and each user account includes a profile image gallery of one or more images of the user. The image assignment module 312 assigns additional images to the user's account. For example, the image assignment module 312 uses image data used to calculate facial feature data sets that were determined to be of the user to assign images to the user's account.

A user's profile image gallery can be used for a variety of purposes. For example, in some embodiments, the images in the profile image gallery can be used for security purposes to identify users. In one such embodiment, the images can be used to ensure that users entering restricted areas are authorized to do so. For example, live images captured of users can be compared to the profile image gallery of authorized users to ensure that any user entering the restricted area is authorized to do so.

As another example, a user's profile image gallery can be used to generate a three dimensional model of the user. Images of various angles of the user can be used to formulate a three dimensional model, which can be used for video games, or other purposes.

Figure 4:
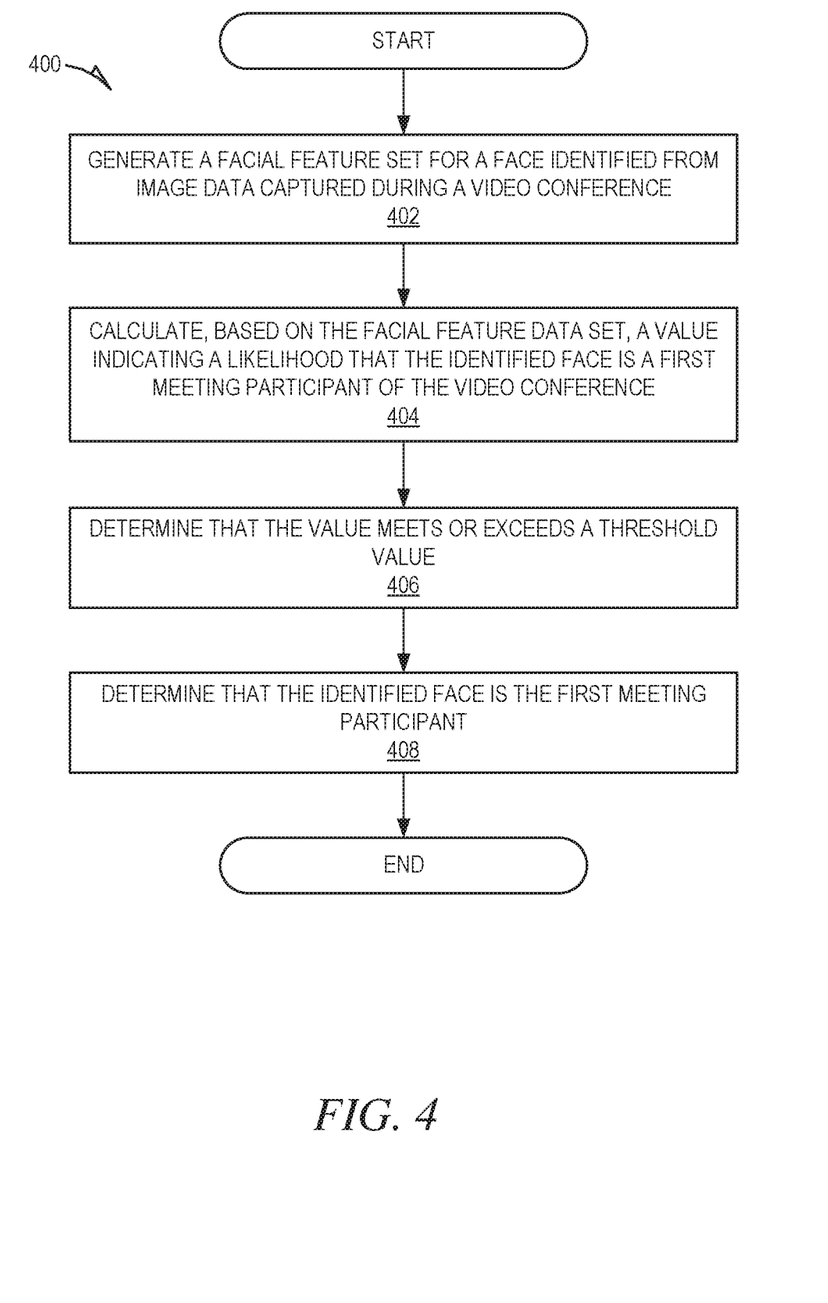
FIG. 4 is a flowchart showing an example method of automated profile image generation based on scheduled video conferences, according to certain example embodiments.

FIG. 4 is a flowchart showing an example method 400 of automated profile image generation based on scheduled video conferences, according to certain example embodiments. The method 400 may be embodied in computer readable instructions for execution by one or more processors such that the operations of the method 400 may be performed in part or in whole by the profile image generation system 108; accordingly, the method 400 is described below by way of example with reference thereto. However, it shall be appreciated that at least some of the operations of the method 400 may be deployed on various other hardware configurations and the method 400 is not intended to be limited to the profile image generation system 108.

At operation 402, the facial feature data set generation module 304 generates a facial feature data set for a face identified from image data captured during a video conference. A facial feature data set includes numeric values that represent the identified face. For example, the numeric values define a vector that represents the image of the identified face. Each value in the facial feature data set represents a feature of the image data of the identified face.

In some embodiments, the facial feature data set generation module 304 generates a facial feature data set based on each received image of the identified face. Alternatively, the facial feature data set generation module 304 generates a facial feature data set based on a subset of the images of the identified face. For example, the facial feature data set generation module 304 generates the facial feature data set for images of the identified face that are spaced out or determined to be sufficiently distinct from one another. As a result, the facial feature data set generation module 304 will reduce resource usage associated with generating facial feature data sets that are near identical.

The facial feature data set generation module 304 stores the generated facial feature sets in the data storage 314. The facial feature data sets are stored with metadata describing the facial feature data set, such as unique identifier for the video conference from which the facial feature data set was generated. Further, the facial feature data set may be stored along with the image data used by the facial feature data set generation module 304 to generate the facial feature data set.

At operation 404, the likelihood value determination module 308 calculates, based on the facial feature data set, a value indicating a likelihood that the identified face is a first meeting participant of the video conference. The likelihood value determination module 308 calculates the value for each meeting participant of the video conference. The value may be a numeric value, such as a percentage indicating the likelihood that the meeting participant is the face identified from the image data. For example, the value can be 50 to represent that there is a 50% chance that the meeting participant is the identified face.

The likelihood value determination module 308 calculates the value based on a list of meeting participants of the video conference and whether the facial feature data set generated to represent the face was determined to be similar to any previously generated facial feature data sets. If it is determined that the facial feature data set is not similar to any previously generated facial feature data sets, the value determination module 308 calculates the value based on the number of meeting participants that attended the video conference in which the face was detected. For example, the value determination module 308 uses the number of meeting participants to determine a percentage likelihood that each member is the face. For example, if there are only two meeting participants, the likelihood value determination module 308 calculates a value for each meeting participant indicating that there is a 50% chance that each meeting participant is the face. As another example, if the video conference had three meeting participants, the likelihood value determination module 308 calculates a value for each meeting participant indicating that there is a 33% chance that each meeting participant is the face.

Alternatively, if it is determined that the facial feature data set is similar to a previously generated facial feature data set, the likelihood value determination module 308 determines the values based on the number of common meeting participants that attended each of the video conferences in which the face was identified. For example, if the face was identified in two video conferences and only one meeting participant participated in both of those video conferences, the likelihood value determination module 308 calculates a high likelihood value (e.g., 99%, 100%) that the meeting participant that attended both video conferences is the face, and calculates a low likelihood value (e.g., 0%, 1%) for the meeting participants that did not attend both video conferences.

As another example, if only two meeting participants attended both video conferences, the likelihood value determination module 308 calculates a value for each meeting participant indicating that there is a 50% chance that each meeting participant is the face, whereas the meeting participants that attended both video conferences are assigned low values. As the meeting participants continue to attend additional video conferences with varying other meeting participants, additional data will be available to the likelihood value determination module 308, which will in turn make it easier to determine which meeting participant is the identified face.

At operation 406, the identity determination module 310 determines that the value meets or exceeds the threshold value. As a result of the identity determination module 310 determining that the value meets or exceeds the threshold value, at operation 408, the identity determination module 310 determines that the identified face is the first meeting participant. Alternatively, if the identity determination module 310 had determined that the value does not meet or exceed the threshold value (i.e., the value is less than the threshold value), the identity determination module 310 would have determined that the meeting participant is not the identified face or that there is insufficient data to determine with certainty that the meeting participant is the identified face.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant particles having mass, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (CPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse, track ball, etc.). In an example, the display unit 510, input device 512, and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internee protocol (IP), transmission control protocol (TCP), user datagram protocol (UDP), HTTP, etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and P2P networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

In an embodiment, a user or entity accesses the provided application from an instance of machine 500, via a network 526 to another instance of machine 500. It will be understood that the machine used by the entity may be different in architecture than the provider's machine(s), which are typically servers having routing capability, and within one or more data centers.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language that essentially provides a model of how designed hardware is expected to perform. Program code may be assembly or machine language, or data that may be compiled and/or interpreted. Furthermore, it is common in the art to speak of software, in one form or another, as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium, that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), and the like, as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical, or other forms of propagated signals or carrier wave encoding the program code may pass, such as antennas, optical fibers, communications interfaces, and the like. Program code may be transmitted in the form of packets, serial data, parallel data, propagated signals, and so forth, and may be used in a compressed or encrypted format.

Program code may be implemented in programs executing on programmable machines such as mobile or stationary computers, PDAs, smart phones, mobile Internet devices, set top boxes, cellular telephones and pagers, consumer electronics devices (including DVD players, personal video recorders, personal video players, satellite receivers, stereo receivers, cable television (TV) receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked micro-services, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a GPU, a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic, or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such, modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A method comprising:
   generating, based on image data captured during a first video conference, a first facial feature data set for a first identified face identified from the image data captured during the first video conference, the first facial feature data set including a first set of numeric values representing the first identified face identified from the image data captured during the first video conference;
   generating, based on the first set of numeric values, a first vector representing the first identified face from the image data captured during the first video conference;
   identifying, based on a listing of participants of the first video conference, a previous video conference that includes a known meeting participant that also attended the first video conference;
   determining a distance between the first vector and a second vector, the second vector having been generated based on a second set of numeric values representing a second identified face identified from image data captured during the previous video conference, the second identified face having been previously identified as the known meeting participant of the previous video conference that also attended the first video conference;
   calculating, based on the distance between the first vector and the second vector, a first value indicating a likelihood that the first identified face identified from the image data captured during the first video conference is the known meeting participant of the previous video conference that also attended the first video conference;

determining that the first value meets or exceeds a threshold value; and in response to determining that the first value meets or exceeds the threshold value, determining that the first identified face is the known meeting participant of the previous video conference that also attended the first video conference.

2. The method of claim 1, wherein calculating the first value is further based on a determined number of participants of the first video conference that also participated in the previous video conference.

3. The method of claim 1, further comprising:

calculating a second value indicating a likelihood that the first identified face is a second known meeting participant that participated in the first video conference;

determining that the second value does not meet or exceed the threshold value; and in response to determining that the second value does not meet or exceed the threshold value, determining that the first identified face is not the second known meeting participant.

4. The method of claim 1, further comprising:

generating, based on the image data captured during the first video conference, a second facial feature data set for a second identified face identified from the image data captured during the first video conference;

generating a third vector representing the second identified face from the image data captured during the first video conference;

determining a distance between the third vector and the second vector;

calculating, based on the distance between the third vector and the second vector, a second value indicating a likelihood that the second identified face identified from the image data captured during the first video conference is the known meeting participant of the previous video conference that also attended the first video conference;

determining that the second value meets or exceeds the threshold value; and in response to determining that the second value meets or exceeds the threshold value, determining that the second identified face is the known meeting participant of the previous video conference that also attended the first video conference.

5. The method of claim 1, further comprising:

assigning, to an account associated with the first known meeting participant, image data captured during the first video conference that depicts the first identified face determined to be the first known meeting participant.

6. A system comprising:

one or more computer processors; and one or more non-transitory computer-readable mediums storing instructions that, when executed by the one or more computer processors, cause the system to perform operations comprising:

generating, based on image data captured during a first video conference, a first facial feature data set for a first identified face identified from the image data captured during the first video conference, the first facial feature data set including a first set of numeric values representing the first identified face identified from the image data captured during the first video conference;

generating, based on the first set of numeric values, a first vector representing the first identified face from the image data captured during the first video conference;

identifying, based on a listing of participants of the first video conference, a previous video conference that includes a known meeting participant that also attended the first video conference;

determining a distance between the first vector and a second vector, the second vector having been generated based on a second set of numeric values representing a second identified face identified from image data captured during the previous video conference, the second identified face having been previously identified as the known meeting participant of the previous video conference that also attended the first video conference;

calculating, based on the distance between the first vector and the second vector, a first value indicating a likelihood that the first identified face identified from the image data captured during the first video conference is the known meeting participant of the previous video conference that also attended the first video conference;

determining that the first value meets or exceeds a threshold value; and in response to determining that the first value meets or exceeds the threshold value, determining that the first identified face is the known meeting participant of the previous video conference that also attended the first video conference.

7. The system of claim 6, wherein calculating the first value is further based on a determined number of participants of the first video conference that also participated in the previous video conference.

8. The system of claim 6, the operations further comprising:

calculating a second value indicating a likelihood that the first identified face is a second known meeting participant that participated in the first video conference;

determining that the second value does not meet or exceed the threshold value; and in response to determining that the second value does not meet or exceed the threshold value, determining that the first identified face is not the second known meeting participant.

9. The system of claim 6, the operations further comprising:

generating, based on the image data captured during the first video conference, a second facial feature data set for a second identified face identified from the image data captured during the first video conference;

generating a third vector representing the second identified face from the image data captured during the first video conference;

determining a distance between the third vector and the second vector;

calculating, based on the distance between the third vector and the second vector, a second value indicating a likelihood that the second identified face identified from the image data captured during the first video conference is the known meeting participant of the previous video conference that also attended the first video conference;

determining that the second value meets or exceeds the threshold value; and in response to determining that the second value meets or exceeds the threshold value, determining that the second identified face is the known meeting participant of the previous video conference that also attended the first video conference.

10. The system of claim 6, the operations further comprising:
- assigning, to an account associated with the first known meeting participant, image data captured during the first video conference that depicts the first identified face determined to be the first known meeting participant.

11. A non-transitory computer-readable medium storing instructions that, when executed by one or more computer processors of a computing system, cause the computing system to perform operations comprising:
- generating, based on image data captured during a first video conference, a first facial feature data set for a first identified face identified from the image data captured during the first video conference, the first facial feature data set including a first set of numeric values representing the first identified face identified from the image data captured during the first video conference;
- generating, based on the first set of numeric values, a first vector representing the first identified face from the image data captured during the first video conference;
- identifying, based on a listing of participants of the first video conference, a previous video conference that includes a known meeting participant that also attended the first video conference;
- determining a distance between the first vector and a second vector, the second vector having been generated based on a second set of numeric values representing a second identified face identified from image data captured during the previous video conference, the second identified face having been previously identified as the known meeting participant of the previous video conference that also attended the first video conference;
- calculating, based on the distance between the first vector and the second vector, a first value indicating a likelihood that the first identified face identified from the image data captured during the first video conference is the known meeting participant of the previous video conference that also attended the first video conference;
- determining that the first value meets or exceeds a threshold value; and
- in response to determining that the first value meets or exceeds the threshold value, determining that the first identified face is the known meeting participant of the previous video conference that also attended the first video conference.

12. The non-transitory computer-readable medium of claim 11, wherein calculating the first value is further based on a determined number of participants of the first video conference that also participated in the previous video conference.

13. The non-transitory computer-readable medium of claim 11, the operations further comprising:
- calculating a second value indicating a likelihood that the first identified face is a second known meeting participant that participated in the first video conference;
- determining that the second value does not meet or exceed the threshold value; and
- in response to determining that the second value does not meet or exceed the threshold value, determining that the first identified face is not the second known meeting participant.

14. The non-transitory computer-readable medium of claim 11, the operations further comprising:
- generating, based on the image data captured during the first video conference, a second facial feature data set for a second identified face identified from the image data captured during the first video conference;
- generating a third vector representing the second identified face from the image data captured during the first video conference;
- determining a distance between the third vector and the second vector;
- calculating, based on the distance between the third vector and the second vector, a second value indicating a likelihood that the second identified face identified from the image data captured during the first video conference is the known meeting participant of the previous video conference that also attended the first video conference;
- determining that the second value meets or exceeds the threshold value; and
- in response to determining that the second value meets or exceeds the threshold value, determining that the second identified face is the known meeting participant of the previous video conference that also attended the first video conference.

15. The non-transitory computer-readable medium of claim 11, the operations further comprising:
- assigning, to an account associated with the first known meeting participant, image data captured during the first video conference that depicts the first identified face determined to be the first known meeting participant.

* * * * *

UNITED STATES PATENT AND TRADEMARK OFFICE
CERTIFICATE OF CORRECTION

PATENT NO. : 10,423,821 B2
APPLICATION NO. : 15/793861
DATED : September 24, 2019
INVENTOR(S) : Raudies et al.

Page 1 of 1

It is certified that error appears in the above-identified patent and that said Letters Patent is hereby corrected as shown below:

In the Claims

In Column 18, Line 21, in Claim 6, after "and", insert --¶--

Signed and Sealed this
Twenty-seventh Day of October, 2020

Andrei Iancu
*Director of the United States Patent and Trademark Office*